United States Patent
Anand et al.

(10) Patent No.: US 9,338,097 B2
(45) Date of Patent: May 10, 2016

(54) METHOD AND SYSTEM FOR LOAD BALANCING AT A DATA NETWORK

(71) Applicant: Telefonaktiebolaget L M Ericsson (publ), Stockholm (SE)

(72) Inventors: Prashant Anand, Bangalore (IN); Srikar Rajamani, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 180 days.

(21) Appl. No.: 14/068,311

(22) Filed: Oct. 31, 2013

(65) Prior Publication Data

US 2015/0117216 A1    Apr. 30, 2015

(51) Int. Cl.
| | |
|---|---|
| H04L 12/751 | (2013.01) |
| H04L 12/803 | (2013.01) |
| H04L 12/24 | (2006.01) |
| H04L 29/08 | (2006.01) |

(52) U.S. Cl.
CPC ............ H04L 47/125 (2013.01); H04L 41/042 (2013.01); H04L 41/0893 (2013.01); H04L 41/12 (2013.01); H04L 67/1025 (2013.01)

(58) Field of Classification Search
None
See application file for complete search history.

(56) References Cited

U.S. PATENT DOCUMENTS

| | | | | |
|---|---|---|---|---|
| 5,276,789 A * | 1/1994 | Besaw et al. | .................. | 345/440 |
| 7,526,540 B2 * | 4/2009 | Gopisetty et al. | ............. | 709/223 |
| 2009/0097418 A1 * | 4/2009 | Castillo et al. | ............... | 370/255 |
| 2013/0290919 A1 * | 10/2013 | Narayanaswamy | G06F 17/5009 | 716/106 |
| 2014/0214834 A1 * | 7/2014 | Ozonat | ............. | G06F 17/30958 707/737 |
| 2014/0354649 A1 * | 12/2014 | Aksu et al. | ..................... | 345/440 |
| 2015/0081855 A1 * | 3/2015 | Zhang et al. | ................... | 709/220 |
| 2015/0088827 A1 * | 3/2015 | Xu et al. | ........................ | 707/634 |
| 2015/0103672 A1 * | 4/2015 | Stuart | ............................ | 370/241 |

OTHER PUBLICATIONS

"OpenFlow Switch Specification", Version 1.3.1, Sep. 6, 2012, 128 pages.
Kernighan, B. W., et al., "An Efficient Heuristic Procedure for Partitioning Graphs", The Bell System Technical Journal, Feb. 1970, 17 pages.
Koponen et al., "Onix: A Distributed Control Platform for Large-scale Production Networks", USENIX, Sep. 23, 2010, pp. 1-14.
Schmid et al., "Exploiting Locality in Distributed SDN Control", Hot Topics in Software Defined Networking, ACM, Aug. 16, 2013, pp. 121-126.
Zhang et al., "On Resilience of Split-Architecture Networks", Global Telecommunications Conference (Globecom 2011), 2011 IEEE, Dec. 5, 2011, pp. 1-6.

* cited by examiner

*Primary Examiner* — Hassan Phillips
*Assistant Examiner* — Duc Duong
(74) *Attorney, Agent, or Firm* — Nicholson De Vos Webster & Elliot LLP (57) ABSTRACT

A method of load balancing implemented at a data network is disclosed. The data network contains a number of data plane nodes and a number of clusters of a control node. The method starts with deriving a graph from a topology of the data plane nodes, where the graph contains vertices, each representing one of the data plane nodes, and edges, each representing a connection between a pair of data plane nodes. The method continues with partitioning the graph into a number of sub-graphs, where the partition aims at minimizing connectivity among the number of sub-graphs, and where the number of sub-graphs equal to the number of clusters. The control node then assigns each cluster to one of the data plane nodes, where each cluster is assigned to one or more data plane node partitioned into the same sub-graph.

17 Claims, 9 Drawing Sheets

METHOD AND SYSTEM FOR LOAD BALANCING AT A DATA NETWORK

FIELD OF INVENTION

The embodiments of the invention are related to the field of networking. More specifically, the embodiments of the invention relate to a method and system for load balancing at a data network, particularly a network implemented using Software Defined Network (SDN) or network functions virtualization (VFN).

BACKGROUND

In a traditional data network, the functions relating forwarding traffic and determining where to send traffic is done by a single network device. The single network device is commonly said to contain a control plane and a data plane. The traditional integrated approach of the control plane and the data plane being tightly coupled in a single box may result in an overly complicated control plane and complex network management. Due to high complexity, equipment vendors and network operators are often reluctant to initiate changes and the network itself can become fragile and hard to manage over time. This is known to create a large burden and high bather to new protocol and technology developments.

Software Defined Network (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

Figure 1:
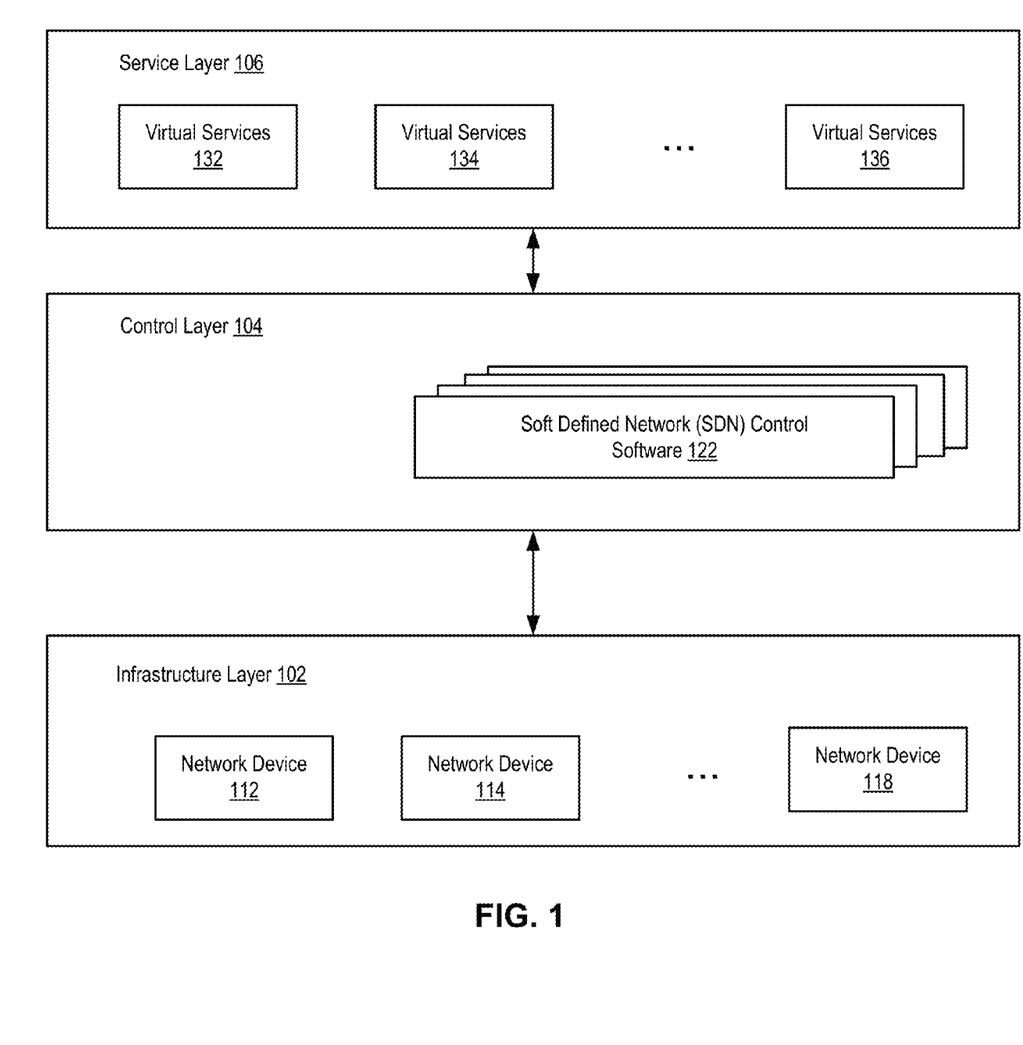
FIG. 1 illustrates a common SDN architecture.

FIG. 1 illustrates a common SDN architecture. At the bottom of the SDN architecture is the infrastructure layer 102, which contains one or more network devices 112-118. Network devices in a SDN network are often referred to as data plane nodes or forwarding elements. When the SDN network complies with a protocol known as OpenFlow (OF), defined by the Open Network Foundation (ONF), a data plane node is referred to as an openflow (OF) switch or simply switch. For this specification, the term "data plane node," "forwarding element", "OF switch" mean network devices in infrastructure layer 102 for traffic forwarding.

The middle layer of the SDN architecture is the control layer 104. Control layer 104 contains SDN control software 122. Control layer 104 is generally implemented in a SDN controller and it contains centralized intelligence of the SDN network. Instead of hand-coding configurations scattered among thousands of devices, a network operator may configure the SDN controller using SDN control software to deploy new applications and change network behavior in real-time. By centralizing network state in the control layer, the SDN architecture gives a network operator the flexibility to configure, manage, secure, and optimize network resources through managing the SDN controller. In addition, the network operator may change SDN control software for her specific need without relying on a vendor of the underlying network devices 112-118 to change its proprietary software.

The upper layer of the SDN architecture is service layer 106. Service layer 106 may interface with control layer 104 via a set of application programming interfaces (APIs). Service layer 106 contains virtual services 132-134 that may be implemented in the SDN network. The virtual services include routing, multicast, security, access, control, bandwidth management, traffic engineering, quality of service, processor and storage optimization, energy use, and all forms of policy management. Thus, a service provider may provide virtual services to a SDN network without being tied to the details of implementation in SDN software and/or network devices. With the abstraction of service layer, the service provider may provide unified services across networks with different implements by different vendors.

Besides SDN, another emerging networking trend is Network Function Virtualization (NFV). NFV leverages standard IT virtualization technology to consolidate many network equipment types onto industrial standard high volume servers, switches, and storage, which could be located in datacenters, network nodes, and in the end user premises. Network function then can be implemented in software, running on a range of industrial standard hardware devices, which can be moved to, or instantiated in, various locations in the network as required. NFV can be implemented using SDN, where the network functions are implemented in the server layer (such as service layer 106 in FIG. 1), and the industrial standard hardware devices are implemented in the SDN control layer and the infrastructure layer.

Within the layered structure of SDN or layered implementation of NFV, a control layer such as SDN control layer 104 plays a central role to manage traffic forwarding and also provide the virtual services to the underlying data plane nodes. Hardware in the control layer such as SDN controller in control layer 104 may be implemented in a number of hardware devices, and how to balance load between the hardware devices is a challenge.

SUMMARY

A method of load balancing implemented at a data network is disclosed. The data network contains a number of data plane nodes carrying user traffic and a number of clusters of a control node managing the data plane nodes. The method starts with deriving a graph from a topology of the data plane nodes, where the graph contains vertices, each representing one of the data plane nodes, and edges, each representing a connection between a pair of data plane nodes. The method continues with partitioning the graph into a number of sub-graphs, each sub-graph containing one or more vertices and edges representing data plane nodes and connections between the data plane nodes respectively, where the partition aims at minimizing connectivity among the number of sub-graphs, and where the number of sub-graphs equal to the number of clusters. The control node then assigns each cluster to one of the data plane nodes, where each cluster is assigned to one or more data plane node partitioned into the same sub-graph.

A method of load balancing implemented at a data network is disclosed. The data network contains a number of data plane nodes carrying user traffic and at least a cluster of a control node managing the data plane nodes. The cluster contains a number of physical servers. The method starts with deriving a graph from a topology of the data plane nodes, where the graph contains vertices, each representing one of the data plane nodes, and edges, each representing a connection between a pair of data plane nodes. The method continues with partitioning the graph into a number of sub-graphs, each sub-graph containing one or more vertices and edges representing data plane nodes and connections between the data plane nodes respectively, where the partition aims at minimizing connectivity among the number of sub-graphs, and where the number of sub-graphs equal to the number of physical servers. The control node then assigns each physical server to one of the data plane nodes, where each physical server is assigned to one or more data plane node partitioned into the same sub-graph.

A network device for of load balancing at a data network is disclosed. The data network contains a number of data plane nodes carrying user traffic and a number of clusters of a control node managing the data plane nodes. The network device contains a graph partitioner, which is configured to derive a graph from a topology of the data plane nodes, where the graph contains vertices, each representing one of the data plane nodes, and edges, each representing a connection between a pair of data plane nodes. The graphic partitioner is further configured to partition the graph into a number of sub-graphs, each sub-graph containing one or more vertices and edges representing data plane nodes and connections between the data plane nodes respectively, where the partition aims at minimizing connectivity among the number of sub-graphs, and where the number of sub-graphs equal to the number of clusters. The network device also contains a control allocator configured to assign each cluster to one of the data plane nodes, where each cluster is assigned to one or more data plane node partitioned into the same sub-graph.

A network device for of load balancing at a data network is disclosed. The data network contains a number of data plane nodes carrying user traffic and at least a cluster of a control node managing the data plane nodes. The cluster contains a number of physical servers. The network device contains a control assignment processor. The control assignment processor contains a graph partitioner and a control allocator. The graph partitioner is configured to derive a graph from a topology of the data plane nodes, where the graph contains vertices, each representing one of the data plane nodes, and edges, each representing a connection between a pair of data plane nodes. The graphic partitioner is further configured to partition the graph into a number of sub-graphs, each sub-graph containing one or more vertices and edges representing data plane nodes and connections between the data plane nodes respectively, where the partition aims at minimizing connectivity among the number of sub-graphs, and where the number of sub-graphs equal to the number of physical servers. The control allocator of the control assignment processor is configured to assign each physical server to one of the data plane nodes, where each physical server is assigned to one or more data plane node partitioned into the same sub-graph. The network device further contains a data plane node topology unit, including at least one of: a data plane node registration unit configured to register the plurality of data plane nodes at the control node, and a data plane node topology discovery unit configured to automatically discover the data plane nodes at the control node, where topology of the data plane nodes is learned from the registration or discovery. The network device further contains a control node database configured to save the learned topology of the data plane nodes.

Embodiments of the invention aims at reducing inter cluster traffic and intra cluster traffic by considering topology of data plane nodes. Through spreading workload based on topology of data plane node instead of ignoring the topology, a SDN system may be more efficient in its operations such as maintaining the topology, setting up path, implementing protocols, and running network applications.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, a switch, or a controller) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). A network device is generally identified by its media access (MAC) address, Internet protocol (IP) address/subnet, network sockets/ports, and/or upper OSI layer identifiers.

Note while the illustrated examples in the specification discuss mainly on SDN system, embodiments of the invention may be implemented in non-SDN system. It can be implemented in a layered network architecture such as a Network Function Virtualization (NFV) architecture. Unless specified otherwise, the embodiments of the invention apply to a control node of a layered network architecture, i.e., they are NOT limited to SDN controller.

SDN Controller and Existing Load Balancing Methods Through Load Balancer

As discussed herein, a SDN controller handles the intelligent actions relating to data plane node traffic forwarding such as topology discovery, link monitoring, traffic steering, and path setup in a SDN network. The SDN controller may be built using commercial off-the-shelf (COTS) hardware with software. For example, the SDN controller may be built using COTS computer clusters (or simply clusters). A cluster consists of a set of coupled computers that work together so that externally it may be viewed as a single logical node. The SDN controller may be built in a scaled out manner using same or similar clusters, where each cluster is responsible for forwarding traffic and providing services to a set of data plane nodes of the SDN network. In one embodiment, such kind load balancing is implemented utilizing a load balancer.

Figure 2:
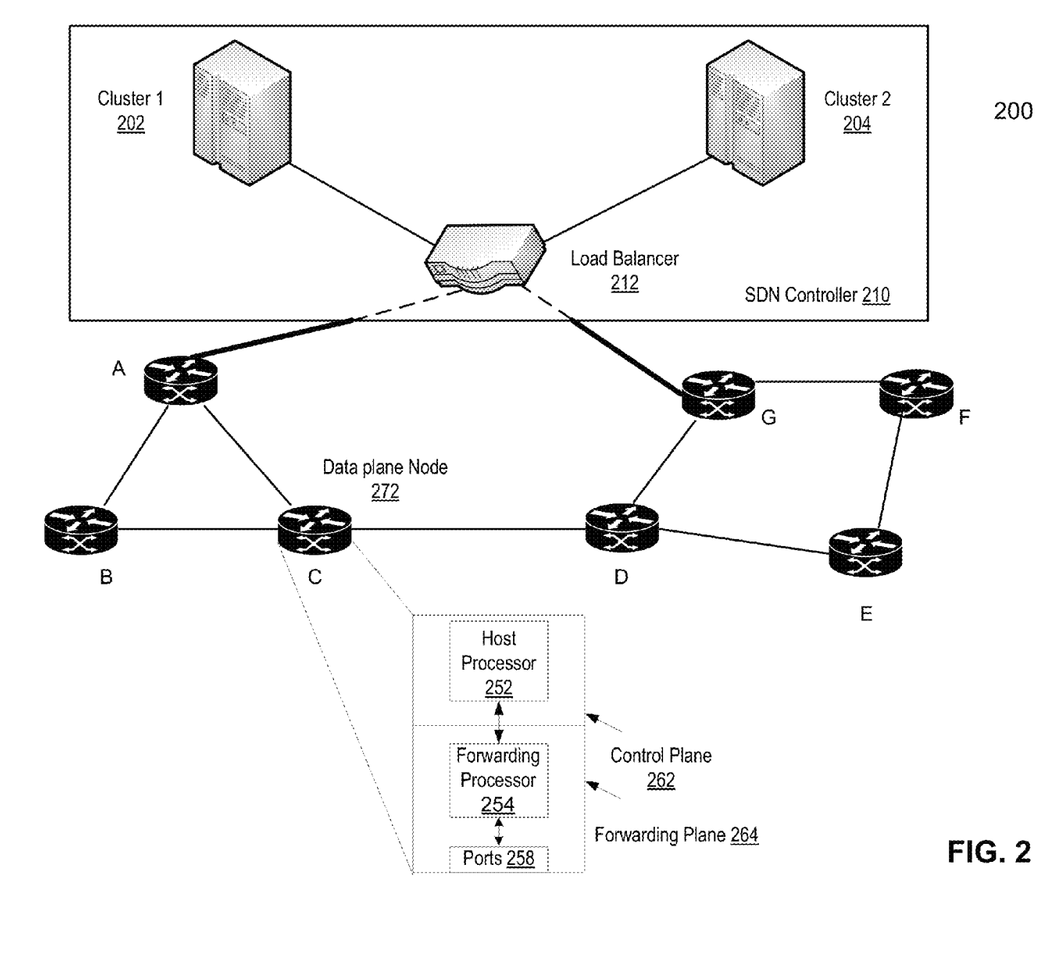
FIG. 2 illustrates load balancing of a SDN system through a load balancer according to one embodiment of the invention.

FIG. 2 illustrates load balancing of a SDN system through a load balancer according to one embodiment of the invention. The SDN system 200 contains a number of data plane nodes A-G and SDN controller 210. Data plane nodes A-G and SDN controller 210 may be implemented in compliance with a SDN standard such as the OpenFlow standards. While only SDN controller 210 is illustrated, one or more additional SDN controllers may manage data plane nodes A-G.

The main task of data plane nodes A-G is to forward packets within the data plane nodes from an ingress port to an egress port, according to the rules in flow tables programmed by the one or more SDN controllers. Each flow entry contains a set of actions such as forwarding packets to a given port, modifying certain bits in a packet header, encapsulating packets to the network controller, or dropping the packets. For the first packet in a new flow, the forwarding element often forwards the packet to the network controller to trigger the new flow being programmed and new dynamic next-hop route being set. It can also be used to forward slow-path packets such as Internet Control Message Protocol (ICMP) packets to the SDN controllers for processing. Note that the concept of a flow can be defined broadly, e.g., a TCP connection, or all traffic from a particular MAC address or IP address. Also note that a packet within network 200 is defined broadly and it may be an Ethernet frame, an IP network packet, or a message in a proprietary format.

In one embodiment, data plane node can be viewed logically as containing two main components. One is a control plane and the other is a forwarding plane (or data plane plane). A zoom-in view of data plane node C at reference 272 illustrates the two planes. Data plane node C contains control plane 262 and forwarding plane 264. Control plane 262 coordinates management and configuration of data plane node C. Configuration of forwarding plane 264 is achieved by running applications on host processor 252. Host processor 252 usually runs an operating system in order to provide a well-known development environment. Commands from host processor 252 are sent to forwarding processor 254 using an interconnect (e.g., a peripheral component interconnect (PCI) bus). Exception packets (e.g., packet for routing and management) are often processed on host processor 252. Forwarding processor 254 interacts with various forwarding ports 258 of data plane node C to forward and otherwise process incoming and outgoing packets.

Forwarding plane 264 is responsible for forwarding traffic (e.g., forwarding operations includes switching, routing, and learning). It contains forwarding processor 254 that is designed to provide high throughput at the detriment of a more complex and flexible development environment. Different types high performance memory and hardware accelerator are often found on board of forwarding processor 254 for achieving the high throughput. In contrast, host processor 252 can be more complex and flexible at the detriment of providing high throughput as it processes more control packets (often referred to as slow path packets) than data packet thus throughput is less mission critical. When data plane node C receives a packet associated with a new flow, it does not know where to forward the packet. Thus it sends the packet to its managing SDN controller (SDN controller 210 in this example). SDN controller 210 receives the packet, and it programs a new flow entry based on its associated prefix and dynamic next-hop. It then sends the new flow entry to data plane node C. Data plane node C then forwards the packet according to the new flow entry.

SDN controller 210 adds and removes flow-entries from a flow table. It defines the interconnection and routing among a set of traffic forward elements and other network devices. It also handles network state distribution, such as collecting information from the set of traffic forward elements and distributing forwarding/routing instructions to them. SDN controller 210 can also be programmed to support new addressing, routing, and complex packet processing applications. A data plane node needs to be coupled to and managed by at least one SDN controller to function correctly.

SDN controller 210 contains load balancer 212 and clusters 1 and 2 at references 202 and 204 respectively. A SDN controller may be front-ended by more than one load balancer and it may contain a much higher number of clusters. For simplicity of illustration, each of data plane nodes A-G is coupled to SDN controller 210 through load balancer 212. In one embodiment, each of the data plane nodes A-G communicates SDN controller 210 through a virtual Internet Protocol address (VIP). The VIP is an IP address assigned to multiple applications and software residing clusters of SDN controller 210, rather than IP addresses to be individually assigned to each application or cluster. In one embodiment, each cluster runs the same applications, and each of the application is stateless with respect to SDN network state and network state is kept separately in a database, which has the responsibility to maintain data consistency and coherency. Each data plane node is coupled to and managed by at least one cluster of a SDN controller (often referred to as "homed" to the at least one cluster) when the data plane node is coupled to and managed by the SDN controller.

Through the VIP, each data plane node communicates and registers itself with SDN controller 210. Each data plane node may also register its ports to the SDN controller. With the information, SDN controller can discover the topology of the data plane nodes. One way of the discovery is through link layer discovery protocol (LLDP), where SDN controller 210 injects a LLDP packet with correct data path identifier and port identifier through a data plane node. The data plane node then passes the packet to the next data plane node, which then returns the packet to SDN controller 210. Through a series of LLDP packet transmission, SDN controller 210 will be able to build the topology of the data plane nodes A-G.

When load balancer 212 performs load balancing, it typically considers workloads at various clusters and tries to distribute the workloads optimally without considering topology of data plane nodes. The approach is suboptimal in many ways. For example:

The topology of data plane nodes is maintained at a SDN controller, and when adjacent data plane nodes are homed to different clusters (e.g., due to evenly distributing workloads among clusters without considering underlying data plane node topology), topology maintenance creates extra inter-cluster traffic. The reason is that LLDP packet is initiated by a first cluster to a data plane node and received at a second cluster from the data plane node's neighboring data plane node, and the received LLDP packet needs to be sent from the second cluster to the first cluster. The inter-cluster traffic is avoidable when both data plane nodes are homed to the same cluster.

The path setup time is likely longer when adjacent data plane nodes are homed to different clusters. In this scenario, the SDN controller has to orchestrate the path through each data plane node. When the data plane nodes are at different clusters, the requirement of path setup such as synchronization will be longer.

Some protocols likely generate more traffic when adjacent data plane nodes are homed to different clusters. For example, bidirectional forwarding detection (BFD), which detects fault between two endpoints over a link, sends out and receives packets sent Similar to LLDP for topology discovery, extra inter-cluster traffic is generated when a packet needs to be sent from one cluster to another to complete the protocol. In addition, protocols running on top of the SDN controller such as routing protocols (e.g., Border Gateway Protocol) or address resolution protocol (ARP) require control packets from the data plane nodes. Apart from increased inter cluster traffic overhead, the extra messages passing through the clusters increase the convergence time for routing protocol and can result in expiration of protocol timers and trigger route flaps.

Some network applications likely consume more resources when adjacent data plane nodes are homed to different clusters. For example, when adjacent data plane nodes are homed to the same cluster, the cluster may run network applications such as flow analysis at the cluster, instead of running the network applications through multiple clusters.

For multi-tenant networks, data plane nodes that are assigned to different clusters trigger increased intra-cluster traffic.

Thus, embodiments of the invention aims at reducing inter cluster traffic and intra cluster traffic by considering topology of data plane nodes.

Load Balancing Based on Topology of Data Plane Nodes

Figure 3A:
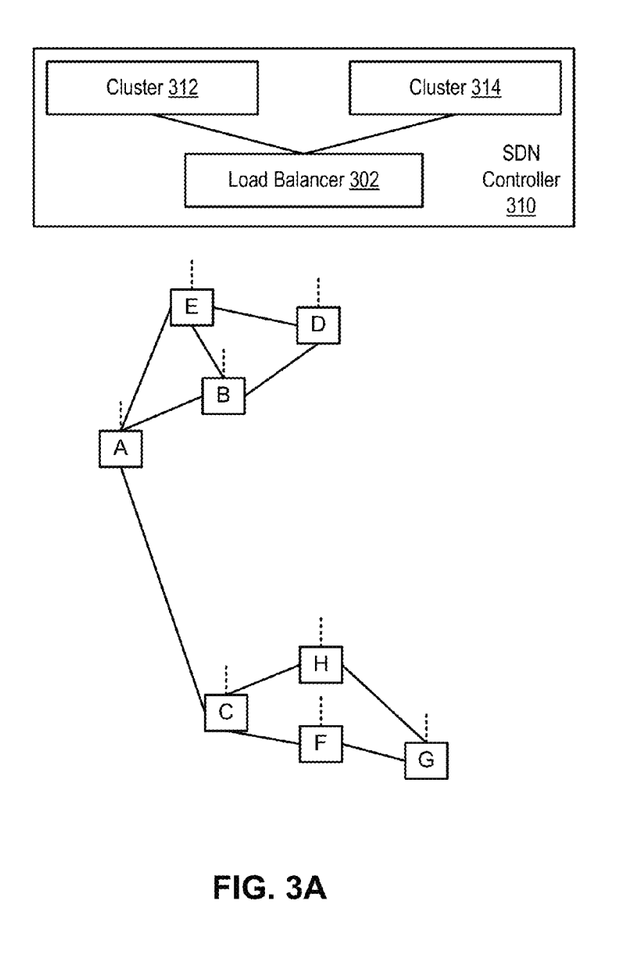
FIGS. 3A-B illustrates load balancing via a load balancer based on topology of data plane nodes according to one embodiment of the invention.
Figure 3B:
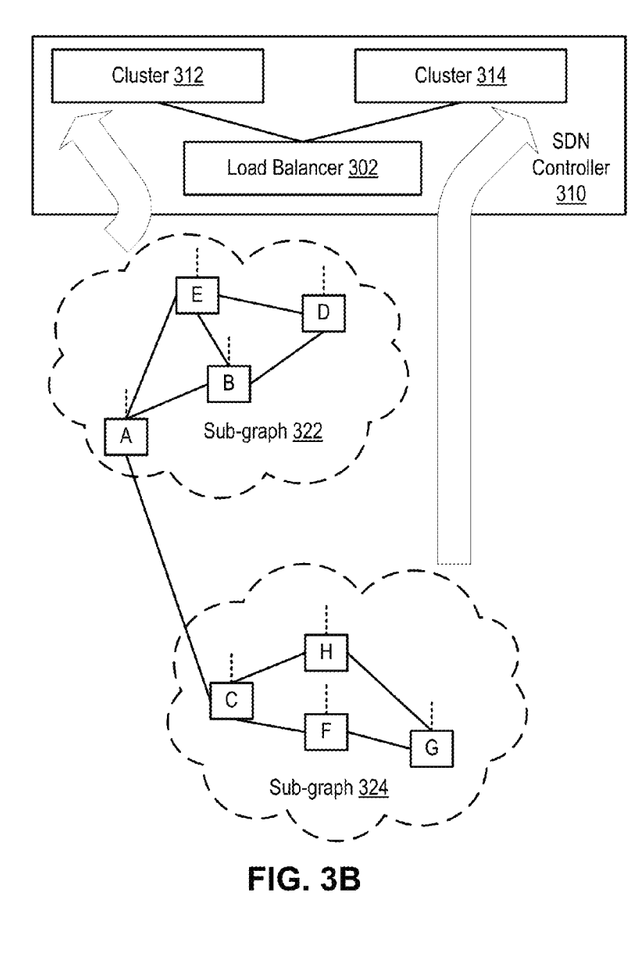

FIGS. 3A-B illustrates load balancing via a load balancer based on topology of data plane nodes according to one embodiment of the invention. FIGS. 3A-B are similar and illustrate a same SDN system, and the same references indicate elements or components having the same functionalities. The SDN system contains SDN controller 310 and data plane nodes A-H. SDN controller 310 contains load balancer 302 and clusters 312 and 314. Note SDN controller 310 contains other components not shown as they are not essential to the invention, such as database cluster function configuration module, load balancing cluster function configuration module, distributed database layer, and others.

Referring to FIG. 3A, each of data plane nodes A-H is coupled to a single cluster (the coupling is illustrated by a single dotted line at the top of each box representing a data plane node), and the coupling is determined by load balancer 302, and it may be based on workload distribution of the clusters (e.g., load balancer 302 couples a data plane node to a cluster with the least workload). Through the coupling, SDN controller 310 learns the topology of the data plane nodes. From the topology, SDN controller 310 derives a graph. The graph contains vertices, each representing a data plane node, and edges, each representing a connection between a pair of data plane nodes.

Out of the graph, SDN controller 310 creates a number of connected sub-graphs through one of a number of graph partitioning algorithms. The graph partitioning algorithms can aim at creating maximally intra-connected sub-graphs and/or least inter-connected sub-graphs. The number of sub-graphs equals to the number of clusters so that each cluster can be assigned to one sub-graphs (consist of data plane nodes). At FIG. 3B, data plane nodes A, B, D, and E form sub-graph 322 and data plane nodes C, F, G, and H form sub-graph 324. The partitioning is based on one of the graph partitioning algorithm to have the maximum intra-connections within the sub-graphs, and/or minimum inter-connections between the sub-graphs. The number of sub-graphs equals to the number of clusters at two. Thus, cluster 312 is assigned to sub-graph 322 while cluster 314 is assigned to sub-graph 324.

In one embodiment, load balancer 302 then re-couples data plane nodes to their respective clusters according to the graph partitioning algorithm adopted. The load balancing now is optimized based on the topology of data plane nodes. Whenever the topology of data plane nodes changes, the process can be repeated so that the coupling between the cluster and data plane node is updated to reflect the updated topology.

Through spreading workload based on topology of data plane node instead of ignoring the topology, a SDN system may be more efficient in its operations such as maintaining the topology, setting up path, implementing protocols, and running network applications.

Graph Partitioning

One main step in the load balancing illustrated in FIGS. 3A-B is to partition the topology based graph. The graph can be a unidirectional, connected graph, represented as G=(V, E), where V is the set of vertices that represent the data plane node and E is the set of edges that represent links connecting two data plane nodes. The efficiency of a graph partitioning algorithm largely dependents on minimizing dependencies between sub-graphs. The algorithm may aim at partitioning the graph with the constraint that the edges between the sub-graphs are kept to a minimum. In addition, the algorithm may also aim at the number of vertices within each sub-graph is roughly equal to each other.

Mathematically, graph partitioning is the process by which a graph G=(V, E) is partitioned into k sub-graphs ($V_1$, $V_2$, ... $V_k$) such that the parts are disjoint and are of equal size and the number of edges with endpoints in different parts is minimized Graph partitioning is considered as a non-deterministic polynomial-time hard (NP-hard) problem and algorithms to effectively partition a graph are based on heuristics.

Known heuristic algorithms can be used for graph partitioning at a SDN system (or other similar systems) includes the Kernighan-Lin algorithm, multi-level method, spectral partitioning and spectral bisection, and etc. The detail implementation of various heuristic algorithms is understood by the person in the ordinary skill of the art thus not details in this specification.

Figure 4:
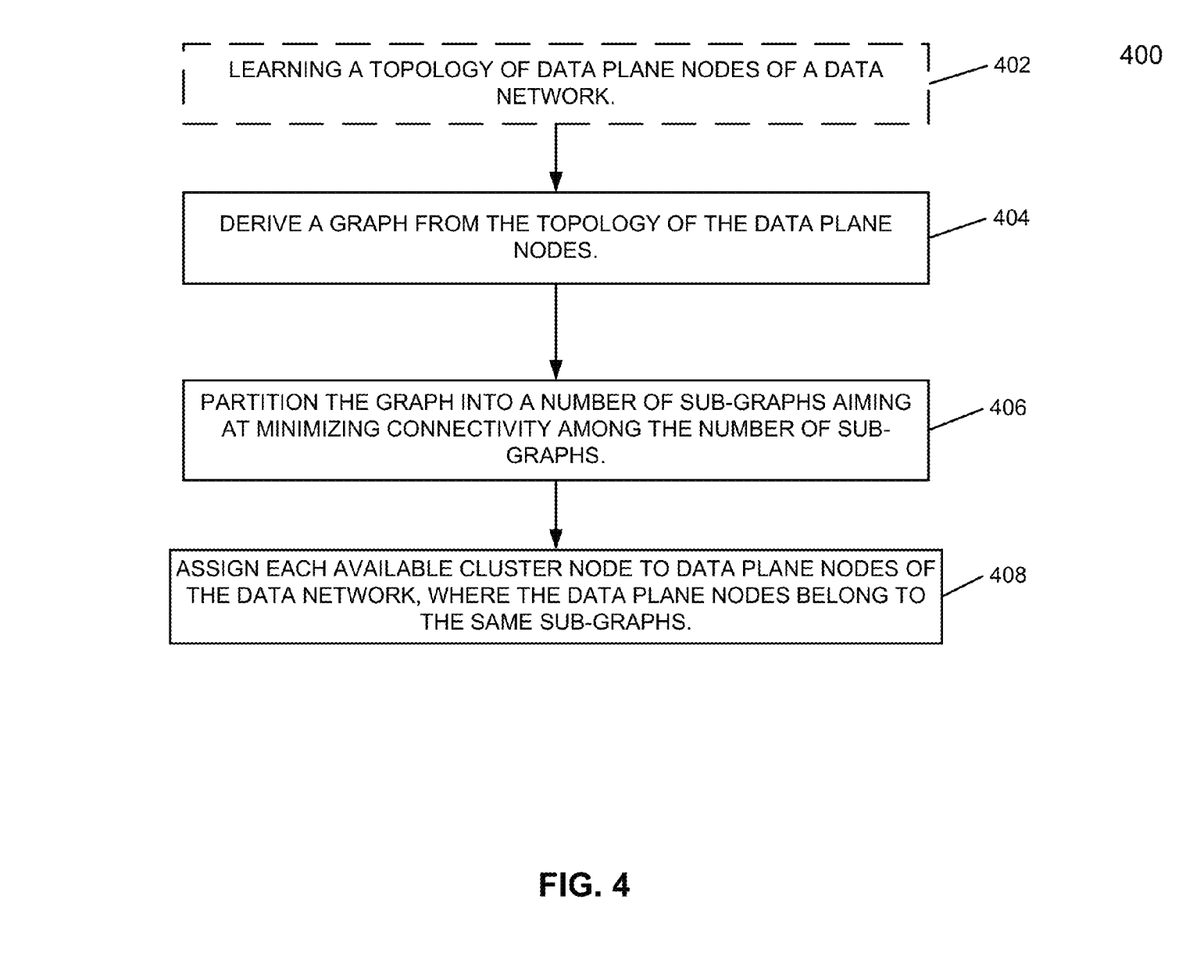
FIG. 4 is a flow diagram illustrating load balancing via a load balancer based on topology of data plane nodes according to one embodiment of the invention.

The process of running a graph partitioning algorithm can be summarized as the following:
Input: Unidirectional graph G=(V, E) and number of available cluster, P.
Partition G so that:
$N=N_1 \cup N_2 \ldots \cup N_p$, with each $N_i \cong N_p$
Using heuristic partitioning algorithm such as:
Kernighan-Lin algorithm;
Multi-level method; and
Spectral partitioning and spectral bisection.
Embodiments of Load Balancing Via Load Balancer FIG. 4 is a flow diagram illustrating load balancing via a load balancer based on topology of data plane nodes according to one embodiment of the invention. Method 400 may be implemented at a control node of a data network (such as a SDN controller of a SDN network), which contains a number of data plane nodes carrying user traffic and a number of clusters managing the data plane nodes (referring to as "available clusters). A load balancer frontends the control node and it performs load balancing function for the control node.

The method optionally starts with learning the topology of data plane nodes of the data network at reference 402. The topology may be learned through registration of the data plane nodes at the control node (commonly done at a SDN controller for example). It may also be learned through dynamic discovery of the data plane node through a topology maintenance process.

From the topology of data plane nodes, the control node derives a graph at reference 404. The graph contains vertices, each representing a data plane node, and edges, each representing a connection between a pair of data plane nodes of the data network. Note in one embodiment, the edges carry weights based on bandwidth capacity and latency of the represented links connecting the data plane nodes. That is, connections may be treated differently depending on the characteristics of the links making the connections.

At reference 406, the graph is partitioned into a number of sub-graphs, where the number of sub-graphs equals the number of available clusters, and where the objective of the partition is to minimize connectivity among the sub-graphs. As discussed herein above, graph partition is a NP-hard problem mathematically and a number of heuristic algorithms may be implemented. For example, the algorithm may be one of Kernighan-Lin algorithm, multi-level method, and spectral partitioning and spectral bisection. Note one additional restriction of the partition is that the sub-graphs contain substantially the same number of vertices.

While the graph partition is based on minimizing connectivity among the sub-graphs, other criteria may also be considered. For example, a control node may also consider existing workloads of the clusters as a tie-breaker when different sub-graph partitions yield similar inter sub-graph connectivity but one yields more even workload among the clusters.

At reference 408, the control node assigns each available cluster to data plane nodes based on the graph partition so that each available cluster is assigned to a set of data plane nodes partitioned into the same sub-graph. After the assignment, the control node may rearrange coupling of data plane nodes to the clusters so that each data plane node is managed/controlled by the assigned cluster.

Embodiments of Load Balancing without Load Balancer

Figure 5:
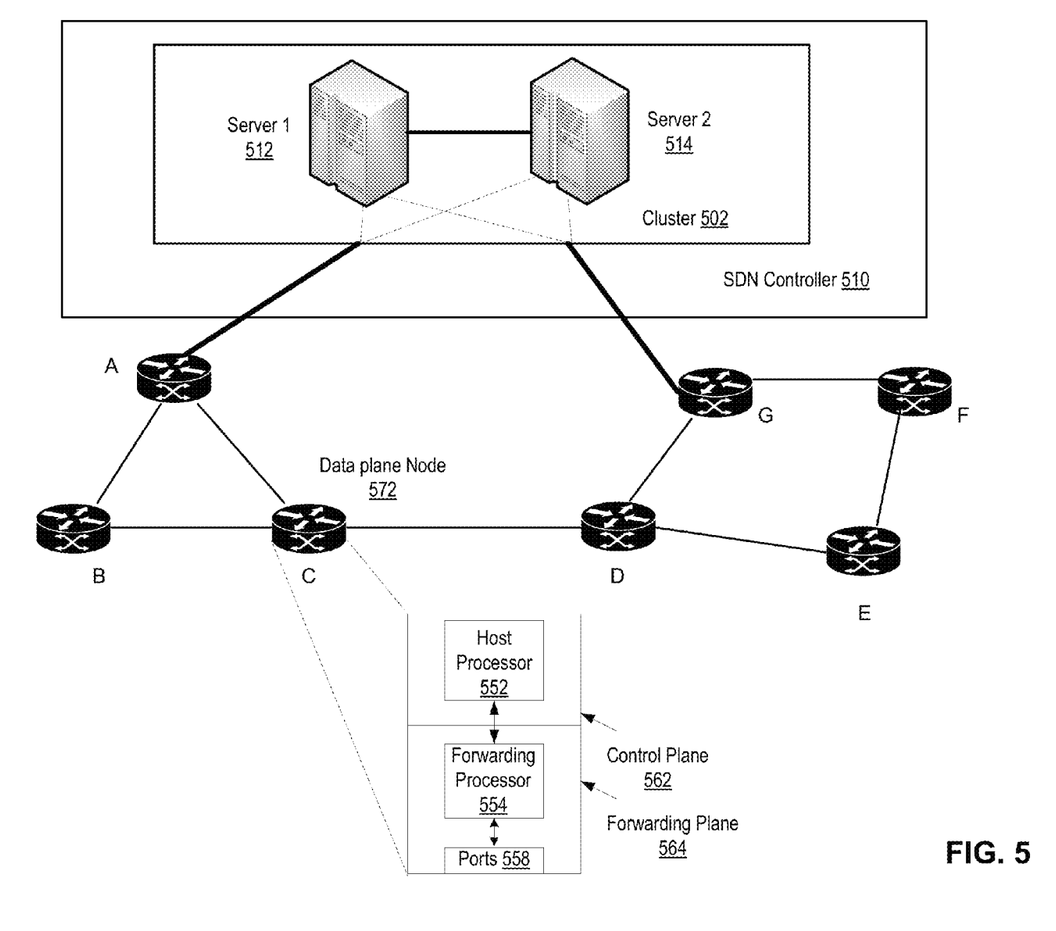
FIG. 5 illustrates load balancing of a SDN system without load balancer according to one embodiment of the invention.

In some embodiments, load balancing may be accomplished using embodiments of the invention without a load balancer. FIG. 5 illustrates load balancing of a SDN system without load balancer according to one embodiment of the invention. FIG. 5 is similar to FIG. 2, and the same or similar references indicate elements or components having the same or similar functionalities. One difference between the two figures is that SDN controller 510 of FIG. 5 does not contain a load balancer. Instead of having a single virtual IP address for the SDN controller, SDN controller 510 corresponds to multiple VIPs, each for a physical server of cluster node 502.

As illustrated, each data plane node has two VIP based connections to cluster 510, one each for servers 1 and 2 at references 512 and 514. Servers 1 and 2 serve as a master server or slave server for each data plane node. Servers 1 and 2 together offer 1:1 high availability (HA). Note in some embodiment, one server may serve as the master server while multiple servers serve as the slave servers, and together they may operate in N:1 HA mode. At 1:1 or N:1 HA mode, the master and slave servers coordinate with each other through state replication, and synchronization through heartbeat and other cluster operations. While each physical server serves a master or slave role, a physical server may be a master server for one data plane node and slave server for another data plane node. In normal operation, the workload of a data plane node is handled mainly by the master server. Thus, to balance workload between servers 1 and 2, each can be assigned to be the sole master node of a data plane node so that each data plane node is coupled to one single master node and one slave node.

Figure 6A:
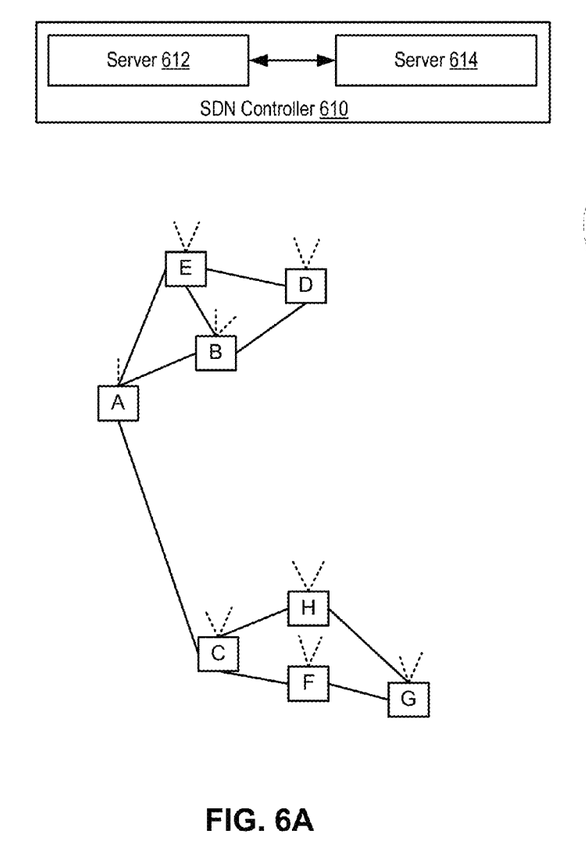
FIGS. 6A-B illustrates load balancing based on topology of data plane nodes without a load balancer according to one embodiment of the invention.
Figure 6B:
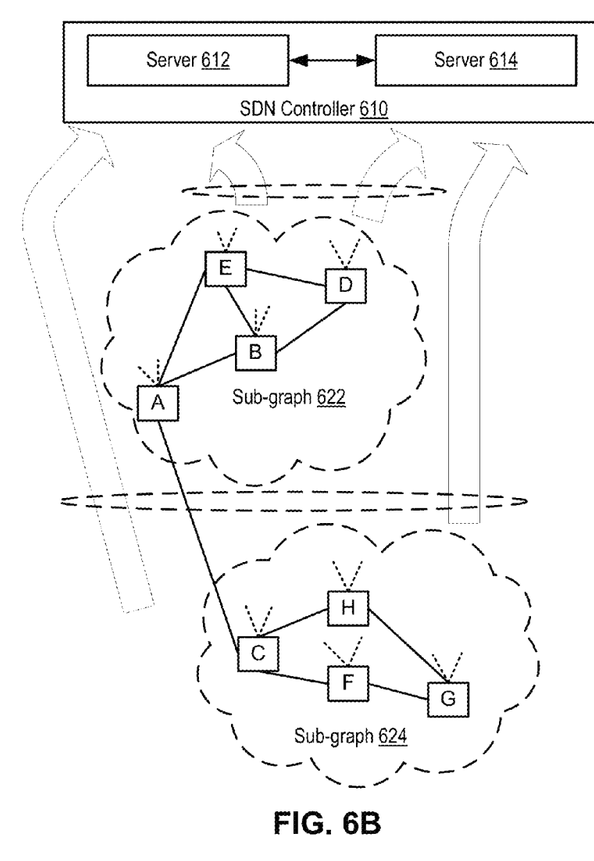

FIGS. 6A-B illustrates load balancing based on topology of data plane nodes without a load balancer according to one embodiment of the invention. FIGS. 6A-B are similar to FIGS. 3A-B respectively, and the same or similar references indicate elements or components having the same or similar functionalities.

One difference between FIGS. 6A-B and FIGS. 3A-B is that SDN controller 602 does not utilize load balancer for workload balancing, and servers 612 and 614 are in high availability mode and serve as master and slave servers for each data plane node. In other words, each data plane node has VIP access to both servers, although for a given data plane node, only one master server manages operations of the data plane node. In FIGS. 6A-B, the coupling of each data plane node with both servers is illustrated with two dotted lines at the top of each box representing a data plane node. The processes of topology discovery and graph partitioning of FIGS. 6A-B are similar to the processes illustrated in FIGS. 3A-B and discussed herein above. The difference is that after the sub-graph is partition, the servers are assigned each data plane node in FIG. 6B instead of clusters in FIG. 3B. For data plane nodes within sub-graph 622 (i.e., nodes A, B, D, and E), server 612 is assigned to be the master server, and server 614 is assigned to be the slave server. For data plane nodes within sub-graph 624 (i.e., nodes C, F, G, and H), server 614 is assigned to be the master server, and server 612 is assigned to the slave server. When the prior coupling of master/slave servers is different from the assignment, SDN controller 610 will cause rearrange so that the master/slave server coupling complies with the assignment.

Figure 7:
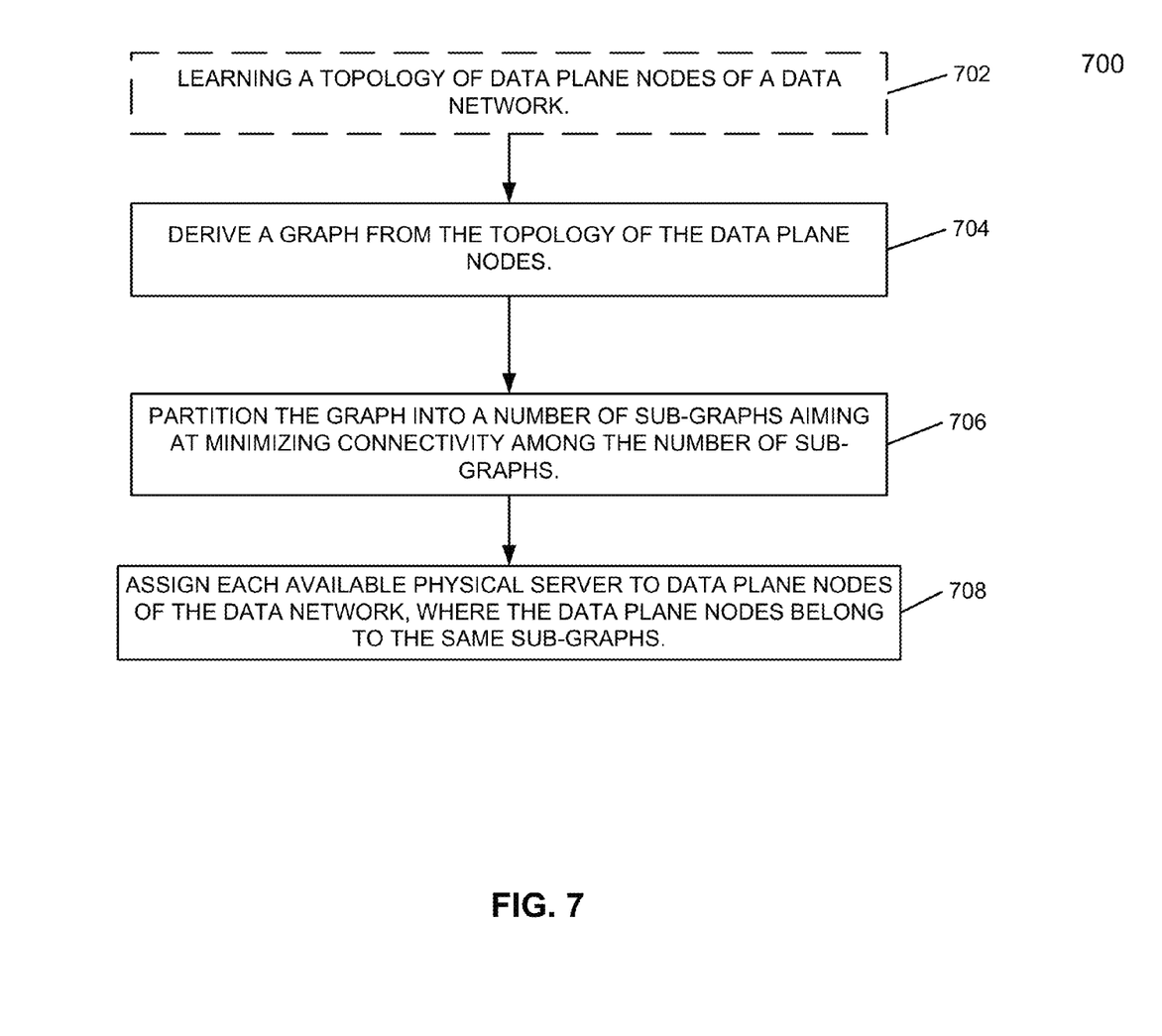
FIG. 7 is a flow diagram illustrating load balancing based on topology of data plane nodes without a load balancer according to one embodiment of the invention.

FIG. 7 is a flow diagram illustrating load balancing based on topology of data plane nodes without a load balancer according to one embodiment of the invention. Method 700 may be implemented at a control node of a data network (such as a SDN controller of a SDN network), which contains a number of data plane nodes carrying user traffic and at least one cluster managing the data plane nodes. The cluster contains multiple available physical servers to manage the data plane nodes, and each data plane node has connectivity to more than one physical server, where one physical server serves as the master server for each data plane node, and other one or more physical servers server serves as the slave server. The master/slave servers synchronize with each other during operations.

Referring to FIG. 7, operations within references 702-706 are similar to operations within references 402-406 thus are not repeated here. One difference is that the number of sub-graphs equal to the number of available physical servers for load balancing at reference 706. At reference 708, the control node assigns each available physical server to data plane nodes based on the graph partition so that each available physical server is assigned to a set of data plane nodes partitioned to the same sub-graph. The assignment means that the assigned physical server serves as the master server for the set of data plane nodes, and the other physical servers serve only as the slave servers. After the assignment, the control node may rearrange coupling of data plane nodes to the physical servers so that each data plane node is served by the newly assigned master/slave servers.

Network Devices Implementing Method of Load Balancing

Figure 8:
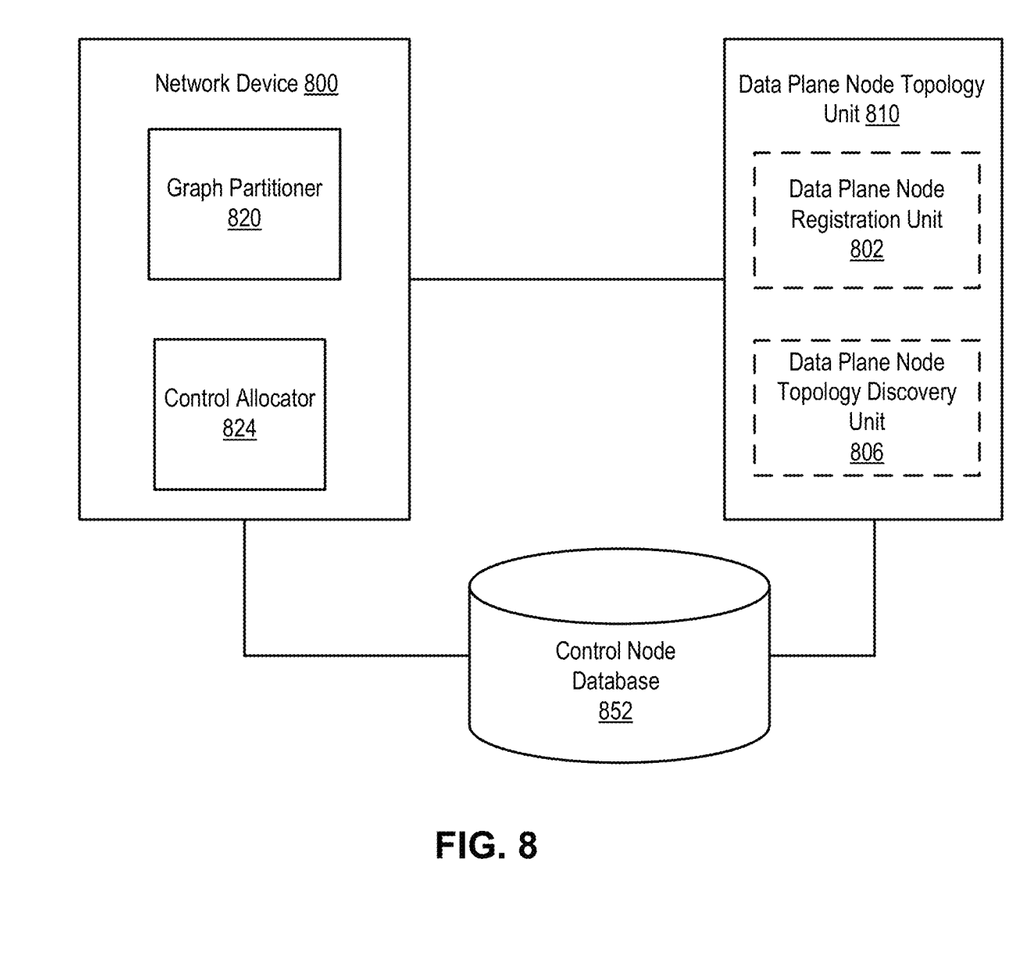
FIG. 8 is a block diagram illustrating network devices implementing a method of load balancing according to one embodiment of the invention

FIG. 8 is a block diagram illustrating network devices implementing a method of load balancing according to one embodiment of the invention. The network devices are coupled to a data network (such as a SDN network or a network implementing NFV), where the data network contains a number of data plane nodes, which carry user traffic, and one or more clusters managing the data plane nodes. Load balancing is performed by at least three components, network device 800, data plane node topology unit 810, and Control node database 852. In one embodiment, the three components are located within a SDN controller. In an alternate embodiment, one or more components are coupled with but outside of the SDN controller.

Network device 800 contains graph partitioner 820 and control allocator 824. Data plane node topology unit 810 contains at least one of data plane node registration unit 802 and data plane node topology discovery unit 806. A control node database 852 is coupled to both network device 800 and data plane node topology unit 810.

In one embodiment, network device 800 is a load balancer of a data network (such as a SDN controller). The load balancer works with data plane node topology unit 810 and control node database 852 to balance workload. The process starts at data plane node topology unit 810, where it contains data plane node registration unit 802 configured to register the number of data plane nodes at the control node, and/or data plane node topology discovery unit 806 configured to automatically discover the data plane nodes. The topology of the data plane nodes is learned from the registration or discovery at data plane node registration unit 802 and data plane node topology discovery unit 806 respectively. The learned topology is saved at control node database 852.

Graph partitioner 820 and control allocator 824 may contain processor individually or share a single processor. The processor can be a general purpose or special purpose processors and the modules may be implemented as a single unit. Graph partitioner 820 is configured to derive a graph from the topology of the data plane nodes saved in control node database 852. The graph contains vertices, each representing one of the data plane nodes, and edges, each representing a connection between a pair of data plane nodes. The edges may carry weight as discussed herein above. The graph partitioner 820 is further configured to partition the graph into a number of sub-graphs, where each sub-graph contains one or more vertices and edges representing data plane nodes and connections between the data plane nodes respectively. The number of sub-graphs equals to the number of available clusters for load sharing within the control node. The partitioning aims at minimizing connectivity among the number of sub-graphs. As discussed herein above, a number of graph partitioning algorithms may be implemented. After the partitioning, the controller allocator 824 is configured to assign each cluster to one of the data plane nodes, where each cluster is assigned to one or more data plane node partitioned into the same sub-graph. In one embodiment, the number of data plane node within each sub-graph is substantially the same.

In one embodiment, network device 800 is not a load balancer and there are multiple physical servers associated with each of one or more clusters. Within the multiple physical servers within one cluster, one serves as the master server and another serves as the slave server, and data plane nodes have connectivity with their respective master and slave servers.

In that embodiment, network device 800 works with data plane node topology unit 810 and control node database 852 to balance workload too. The process also starts at data plane node topology unit 810, where it contains data plane node registration unit 802 configured to register the number of data plane nodes at the control node, and/or data plane node topology discovery unit 806 configured to automatically discover the data plane nodes. The topology of the data plane nodes is learned from the registration or discovery at data plane node registration unit 802 and data plane node topology discovery unit 806 respectively. The learned topology is saved at control node database 852.

Graph partitioner 820 and control allocator 824 may contain processor individually or share a single processor. The processor can be a general purpose or special purpose processors and the modules may be implemented as a single unit. Graph partitioner 820 is configured to derive a graph from the topology of the data plane nodes saved in Control node database 852. The graph contains vertices, each representing one of the data plane nodes, and edges, each representing a connection between a pair of data plane nodes. The edges may carry weight as discussed herein above. The graph partitioner 820 is further configured to partition the graph into a number of sub-graphs, where each sub-graph contains one or more vertices and edges representing data plane nodes and connections between the data plane nodes respectively. The number of sub-graphs equals to the number of available physical servers for load sharing within the control node. The partitioning aims at minimizing connectivity among the number of sub-graphs. As discussed herein above, a number of graph partitioning algorithms may be implemented. After the partitioning, the controller allocator 824 is configured to assign each physical server to one of the data plane nodes, where each physical server is assigned to one or more data plane node partitioned into the same sub-graph. In one embodiment, the number of data plane node within each sub-graph is substantially the same.

Figure 9:
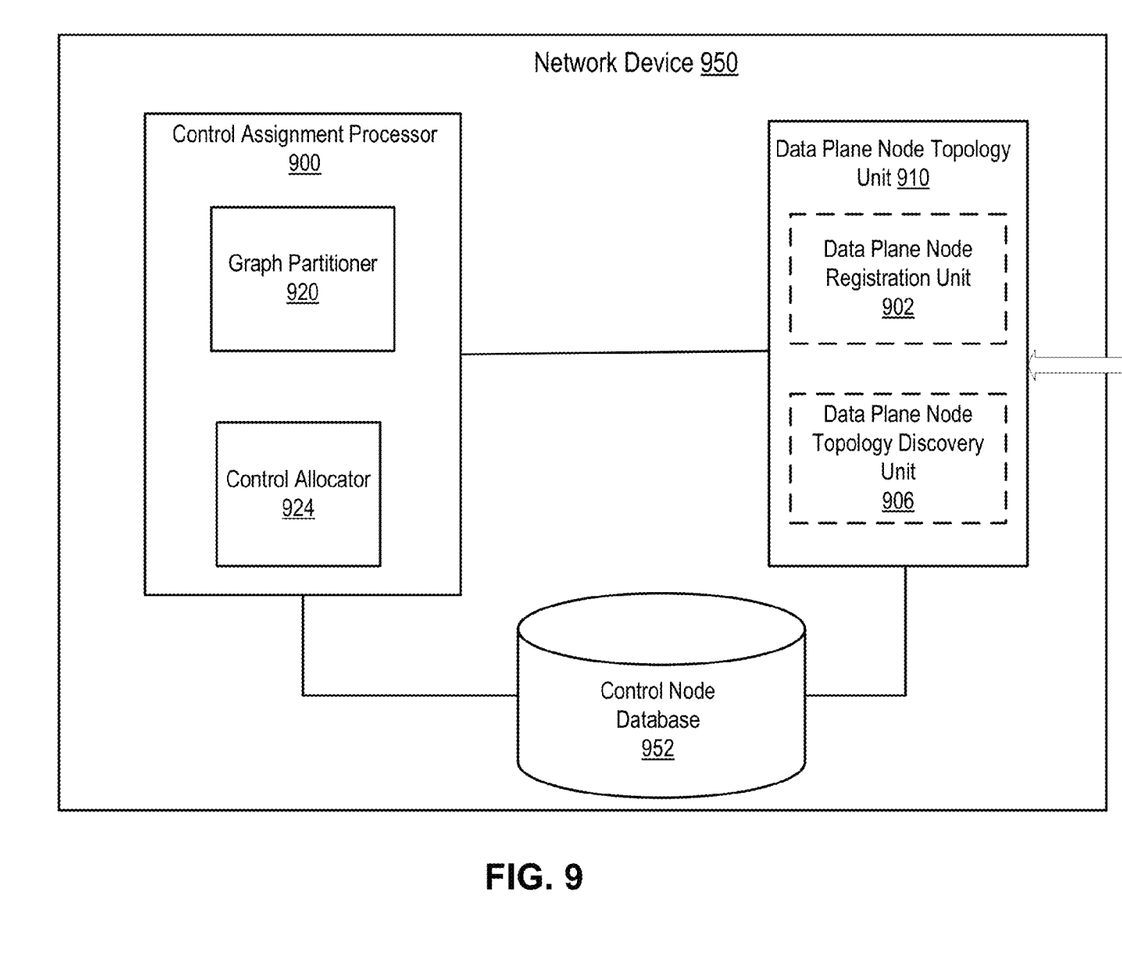
FIG. 9 is a block diagram illustrating a network device implementing a method of load balancing according to another embodiment of the invention

FIG. 9 is a block diagram illustrating a network device implementing a method of load balancing according to another embodiment of the invention. The network device 950 is coupled to a data network (such as a SDN network or a network implementing NFV), where the data network contains a number of data plane nodes, which carry user traffic, and one or more clusters managing the data plane nodes. Load balancing is performed by at least three components within network device 950, control assignment processor 900, data plane node topology unit 910, and Control node database 952.

FIG. 9 is similar to FIG. 8, and the same or similar references indicate elements or components having the same or similar functionalities. One main difference is that network device 950 contains the components for topology based load balancing instead of different components coupled together for the operations. Network device 950 may be utilized in a data network (such as a SDN network or a network implementing NFV) with or without load controller similarly as the illustrated in FIG. 8.

Note the operations of the flow diagrams in FIGS. 4 and 7 are described with reference to the exemplary embodiment of FIGS. 8 and 9. However, it should be understood that the operations of flow diagrams can be performed by embodiments of the invention other than those discussed with reference to FIGS. 8 and 9, and the embodiments discussed with reference to FIGS. 8 and 9 can perform operations different than those discussed with reference to the flow diagrams of FIGS. 4 and 7.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device, or a cloud centralized management system at a data center). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented at a data network, wherein the data network contains a plurality of data plane nodes carrying user traffic and a plurality of clusters of a control node managing the plurality of data plane nodes, the method comprising:

learning the topology of the plurality of data plane nodes based on one of: registration of the data plane nodes at the control node, and automatic discovery of the data plane nodes at the control node;

deriving a graph from a topology of the plurality of data plane nodes, wherein the graph contains vertices, each representing one of the plurality of data plane nodes, and edges, each representing a connection between a pair of data plane nodes within the plurality of data plane nodes;

partitioning the graph into a plurality of sub-graphs, each sub-graph containing one or more vertices and edges representing data plane nodes and connections between the data plane nodes respectively, wherein the partition aims at minimizing connectivity among the plurality of sub-graphs, and wherein the plurality of sub-graphs equal to the plurality of clusters; and assigning each cluster to one of the plurality of data plane nodes, wherein each cluster is assigned to one or more data plane node partitioned into a same sub-graph.

2. The method of claim 1, wherein partitioning the graph into the plurality of sub-graphs further aims making each sub-graph contains substantially same number of vertices.

3. The method of claim 1, wherein assigning each cluster is performed by a load balancer of a software defined network (SDN) controller, and wherein the control node is the SDN controller.

4. The method of claim 1, wherein the edges of the graph carries weights based on at least one of bandwidth and latency of links connecting the plurality of data plane nodes.

5. A method implemented at a data network, wherein the data network contains a plurality of data plane nodes carrying user traffic and at least a cluster of a control node managing the plurality of data plane nodes, the cluster containing a plurality of physical servers, the method comprising:
- learning the topology of the plurality of data plane nodes prior to deriving the graph based on one of:
- registration of the data plane nodes at the control node, and
- automatic discovery of the data plane nodes at the control node;
- deriving a graph from a topology of the plurality of data plane nodes, wherein the graph contains vertices, each representing one of the plurality of data plane nodes, and edges, each representing a connection between a pair of data plane nodes within the plurality of data plane nodes;
- partitioning the graph into a plurality of sub-graphs, each sub-graph containing one or more vertices and edges representing data plane nodes and connections between the data plane nodes respectively, wherein the partition aims at minimizing connectivity among the plurality of sub-graphs, wherein the plurality of sub-graphs equal to the plurality of physical servers; and
- assigning each physical server to one of the plurality of data plane nodes, wherein each physical server is assigned to one or more data plane node partitioned into a same sub-graph.

6. The method of claim 5, wherein each data plane node has a plurality of IP connections to the control node through a plurality of IP addresses of the control node, wherein each of the plurality of IP addresses corresponds to one of the plurality of physical servers, wherein one physical server serves as a master server for the data plane node, and the rest of the plurality of physical servers having corresponding IP addresses serve as slave servers.

7. The method of claim 6, wherein assigning physical server to one of the plurality of data plane nodes comprises setting the assigned physical server as the master server.

8. The method of claim 5, wherein the control node is a software defined network (SDN) controller.

9. A network device coupled to a data network, wherein the data network contains a plurality of data plane nodes carrying user traffic and a plurality of clusters of a control node managing the plurality of data plane nodes, the network device comprising:
- a graph partitioner configured to derive a graph from a topology of the plurality of data plane nodes, wherein the graph contains vertices, each representing one of the plurality of data plane nodes, and edges, each representing a connection between a pair of data plane nodes within the plurality of data plane nodes,
- the graph partitioner further configured to partition the graph into a plurality of sub-graphs, each sub-graph containing one or more vertices and edges representing data plane nodes and connections between the data plane nodes respectively, wherein the partition aims at minimizing connectivity among the plurality of sub-graphs, and wherein the plurality of sub-graphs equal to the plurality of clusters, and
- a control allocator configured to assign each cluster to one of the plurality of data plane nodes, wherein each cluster is assigned to one or more data plane node partitioned into a same sub-graph;
- wherein the network device coupled to a data plane node topology unit and a controller database,
- wherein the data plane node topology unit comprises one of:
  - a data plane node registration unit configured to register the plurality of data plane nodes at the control node, and
  - a data plane node topology discovery unit configured to automatically discover the plurality of data plane nodes at the control node, wherein topology of the plurality of data plane nodes is learned from the registration or discovery, and
- wherein the controller database configured to save the learned topology of the plurality of data plane nodes.

10. The network device of claim 9, wherein partitioning the graph into the plurality of sub-graphs further aims making each sub-graph contains substantially same number of vertices.

11. The network device of claim 9, wherein the network device is a load balancer of a software defined network (SDN) controller, and wherein the control node is the SDN controller.

12. The network device of claim 9, wherein the edges of the graph carries weights based on at least one of bandwidth and latency of links connecting the plurality of data plane nodes.

13. A network device coupled to a data network, wherein the data network contains a plurality of data plane nodes carrying user traffic and at least a cluster of a control node managing the plurality of data plane nodes, the cluster containing a plurality of physical servers, the network device comprising:
- a control assignment processor, including:
- a graph partitioner configured to derive a graph from a topology of the plurality of data plane nodes, wherein the graph contains vertices, each representing one of the plurality of data plane nodes, and edges, each representing a connection between a pair of data plane nodes within the plurality of data plane nodes,
- the graph partitioner further configured to partition the graph into a plurality of sub-graphs, each sub-graph containing one or more vertices and edges representing data plane nodes and connections between the data plane nodes respectively, wherein the partition aims at minimizing connectivity among the plurality of sub-graphs, wherein the plurality of sub-graphs equal to the plurality of physical servers, and
- a control allocator configured to assign each physical server to one of the plurality of data plane nodes, wherein each physical server is assigned to one or more data plane node partitioned into a same sub-graph; and
- a data plane node topology unit, including at least one of:
- a data plane node registration unit configured to register the plurality of data plane nodes at the control node; and
- a data plane node topology discovery unit configured to automatically discover the plurality of data plane nodes at the control node, wherein topology of the plurality of data plane nodes is learned from the registration or discovery; and
- a controller database configured to save the learned topology of the plurality of data plane nodes.

14. The network device of claim 13, wherein partitioning the graph into the plurality of sub-graphs further aims making each sub-graph contains substantially same number of vertices.

15. The network device of claim 13, wherein each data plane node has a plurality of IP connections to the control node through a plurality of IP addresses of the control node, wherein each of the plurality of IP addresses corresponds to one of the plurality of physical servers, wherein one physical server serves as a master server for the data plane node, and the rest of the plurality of physical servers having corresponding IP addresses serve as slave servers.

16. The network device of claim 15, wherein assigning each data plane node to one of the plurality of physical servers comprises setting the assigned physical server of the plurality of physical servers as the master server.

17. The network device of claim 13, wherein the network device is a software defined network (SDN) controller.

* * * * *